United States Patent
Sotoudeh et al.

(10) Patent No.: US 11,898,919 B2
(45) Date of Patent: *Feb. 13, 2024

(54) FIBER OPTIC PRESSURE SENSOR

(71) Applicant: Intelligent Fiber Optic Systems Corporation, San Jose, CA (US)

(72) Inventors: Vahid Sotoudeh, Los Altos, CA (US); Behzad Moslehi, Los Altos, CA (US); Joshua Kuehn, Boulder Creek, CA (US); Richard J. Black, Menlo Park, CA (US)

(73) Assignee: Intelligent Fiber Optic Systems Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,598

(22) Filed: Nov. 4, 2021

(65) Prior Publication Data

US 2023/0136164 A1    May 4, 2023

(51) Int. Cl.
*G01L 1/24* (2006.01)
*G01L 1/22* (2006.01)
*G01K 11/3206* (2021.01)

(52) U.S. Cl.
CPC .......... *G01L 1/246* (2013.01); *G01K 11/3206* (2013.01); *G01L 1/2281* (2013.01)

(58) Field of Classification Search
None
See application file for complete search history.

(56) References Cited

U.S. PATENT DOCUMENTS

| 8,402,834 | B1 * | 3/2013 | Moslehi | G01L 9/0076 73/705 |
| 11,199,462 | B1 * | 12/2021 | Sotoudeh | G01L 11/025 |
| 2007/0068262 | A1 * | 3/2007 | Skinner | E21B 47/06 73/705 |

* cited by examiner

*Primary Examiner* — Chad H Smith
(74) *Attorney, Agent, or Firm* — File-EE-Patents.com; Jay A. Chesavage (57) ABSTRACT

A temperature correcting pressure gauge which has a diaphragm having at least one surface coupled to a source of pressure to be measured, the diaphragm first surface having a first FBG from a first optical fiber attached in an appropriately sensitive region of the diaphragm, a FBG from a second optical fiber attached to the opposite surface from the first FBG, the first and second FBGs reflecting or transmitting optical energy of decreasing or increasing wavelength, respectively, in response to an applied pressure. The first and second FBGs have nominal operating wavelength ranges that are adjacent to each other but are exclusive ranges and the FBGs also have closely matched pressure coefficients and temperature coefficients.

13 Claims, 7 Drawing Sheets

*Figure 1*
Differential Pressure Transducer
Prior Art

*Figure 2*
Single-ended Pressure Transducer
Prior Art

*Figure 3*

*Figure 4*
Section A-A

Figure 5
Cylindrical Pressure Sensor

Figure 5D
Section D-D

Figure 5E
Section D-D

*Figure 9*
Wavelength Interrogator

FIBER OPTIC PRESSURE SENSOR

This invention was made under DARPA SBIR contract D17PC00406 awarded in 2017. The government has certain rights in this invention.

FIELD OF THE INVENTION

The present invention relates to a pressure sensor. In particular, the invention relates to a temperature-compensated pressure sensor using fiber Bragg gratings (FBGs) applied to a single surface of a diaphragm which is displaced by an applied pressure.

BACKGROUND OF THE INVENTION

Figure 1:
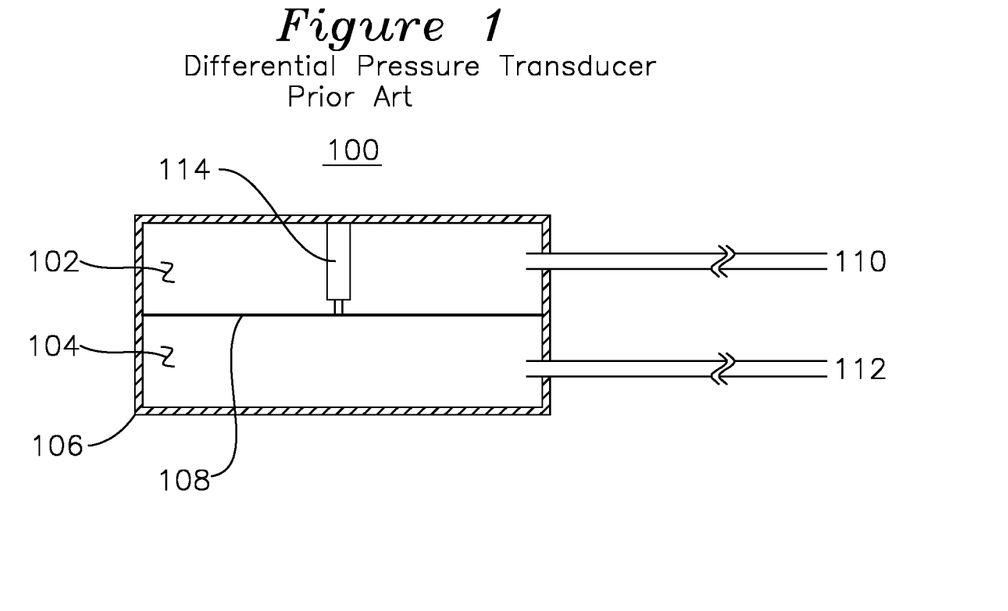
FIG. 1 shows a cross section view of a prior art pressure transducer.

FIG. 1 shows a prior art differential pressure transducer 100. A first pressure port 110 couples into a first chamber 102, and a second pressure port 112 couples to a second chamber 104 formed in housing 106. The differential pressure is thereby transferred to diaphragm 108 in the form of a displacement which is measured by displacement sensor 114.

Figure 2:
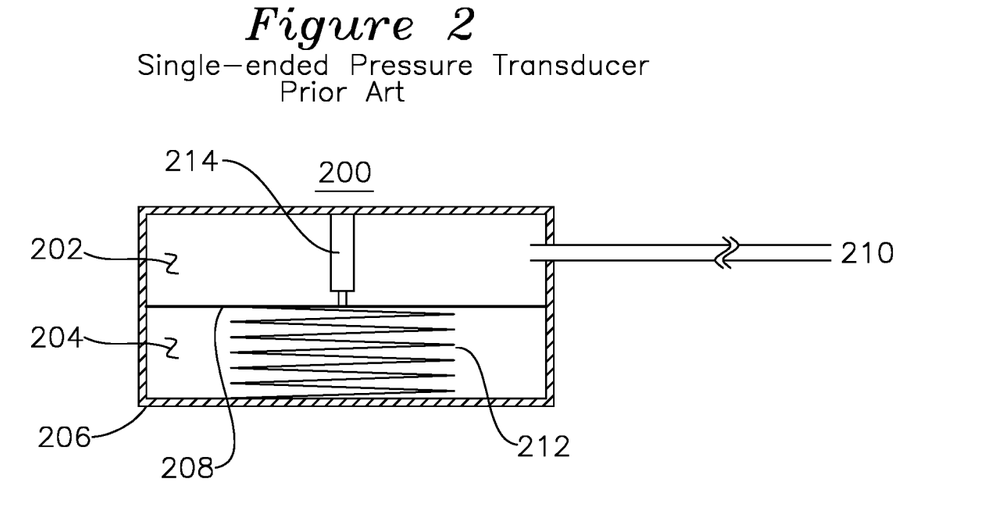
FIG. 2 shows a cross section view of a prior art single ended pressure transducer.

FIG. 2 shows a prior art single-ended pressure transducer 200, which has a pressure inlet 210 coupled to a first chamber 202 which includes generally rigid enclosure 206 walls which surround and support diaphragm 208. A spring 212 provides a resistive pressure, or alternatively, chamber 204 may be filled with a non-hysteresis, temperature neutral fluid, or it may be opened to a neutral pressure environment compared to the pressure to be measured by inlet 210. Displacement sensor 214 measures the diaphragm 208 movement.

In higher pressure applications, the diaphragm 108 of FIG. 1 and diaphragm 208 of FIG. 2 may have a suitable thickness which provides a suitable modulus for the differential pressure in use.

A problem arises in pressure sensors and transducers which utilize fiber optic Bragg gratings, also known as fiber Bragg gratings (FBG), for displacement measurement where the FBG has response coefficients such that the FBG is responsive not only to pressure but also to temperature. Certain environments, such as high temperature, and high pressure measurements, such as supersonic jet exhaust gas, or oil and gas exploration, where temperature variations from 25 degrees C. to 200 degrees C. or more are challenging for prior art pressure sensors. Additionally, it may be required to isolate the sensor on one side of a diaphragm from the gas or liquid being measured on the other side of the diaphragm. In prior art pressure sensor systems, a per-transducer calibration characteristic has been stored, and a separate temperature sensor is used in combination with the strain reading to compensate for this temperature effect on the pressure measurement.

For these reasons, it is desired to provide a pressure sensor for high temperature and high pressure environments which is suitable for single ended or differential pressure measurements.

OBJECTS OF THE INVENTION

A first object of the invention is a temperature compensated pressure sensor having a diaphragm with a pressure applied to one surface and an opposite surface coupled to an optical fiber having at least one FBG in contact with the surface in a region of deflection and a second FBG in thermal equilibrium with the first FBG, but placed in a region which couples minimal diaphragm deflection, the two FBGs coupled to a source of optical energy, the two FBGs transmitting or reflecting narrowband optical energy, and a wavelength interrogator for determination of pressure and temperature based on the reflected or transmitted wavelengths of the FBG.

A second object of the invention is a pressure sensor having a diaphragm coupled to a source of pressure, the diaphragm having an optical fiber with a first FBG mechanically coupled to a deflecting part of the diaphragm, the FBG oriented to couple to mechanical strain of the diaphragm, the diaphragm having a second region with a second FBG which is coupled to the temperature of the first FBG, but not to mechanical strain in the diaphragm, the first and second FBG reflecting or transmitting applied optical energy such that an increase in applied pressure causes the first FBG to reflect or transmit a change in wavelength corresponding to a change in temperature or strain and the second FBG to reflect or transmit a change in wavelength corresponding to a change in temperature only and not to a change in pressure.

A third object of the invention is a process for measurement of pressure applied to a diaphragm having FBGs on the same surface of a diaphragm but different regions of the diaphragm, the FBGs operating in reflection mode or transmission mode, the FBGs coupled to an optical source in a series configuration with one optical fiber having two FBG sensors, or independently to two separate optical fibers, each optical fiber having a separate FBG sensor, and a wavelength interrogator for conversion of reflected or transmitted wavelength shifts into pressure measurements.

SUMMARY OF THE INVENTION

A transducer diaphragm has a first surface with a first optical fiber having a first FBG sensor attached in a measurement region subject to deflection upon application of pressure to the opposite surface of the diaphragm, the first surface also having a datum region in thermal equilibrium with the measurement region but not subject to deflection upon application of pressure to the diaphragm, the datum region coupled to a second FBG sensor for temperature measurement and temperature compensation of the first FBG sensor. The diaphragm first surface measurement region FBG sensor is operative at a wavelength $\lambda 1$ and responsive to temperature and strain, and is formed on an optical fiber, and a second FBG is operative at a second wavelength $\lambda 2$ but which is responsive to primarily temperature and positioned in the datum region of the diaphragm. In one example of the invention, the first optical fiber FBG has a first temperature coefficient $k1=\Delta\lambda 1/\Delta T$ which is closely matched to a second optical FBG temperature coefficient $k2=\Delta\lambda 2/\Delta T$. Additionally, one of the FBG sensors is responsive in a range of wavelengths which is slightly above or below the responsive wavelengths of the other FBG sensor. Each of the FBG sensor gratings generates a narrowband range of response wavelengths, and in the best mode of the invention, these range of response wavelengths are in separate wavelength ranges such that each response can be associated with a particular FBG sensor grating, however other embodiments of the invention may utilize FBG sensors with responses which include overlapping wavelength ranges. When a pressure is applied to the diaphragm, one FBG undergoes an incremental strain which changes the FBG response wavelength, and the other FBG sensor grating is not responsive to the deflection or strain, as it is only coupled to a temperature which is the same as the temperature of the first FBG sensor. A wavelength interrogator converts the first FBG response and the second FBG response into a pressure measurement after compensation for the temperature response which effects both first and second FBG sensor.

DETAILED DESCRIPTION OF THE INVENTION

The present invention is a pressure sensor where a pressure to be measured is provided on one side of a diaphragm and the pressure is estimated by measuring the strain on the opposite surface of the diaphragm using an FBG oriented to capture a maximum strain of diaphragm deflection. The diaphragm may be circular, oval, rectangular, or any shape which deforms when a pressure is applied on one surface of the diaphragm relative to pressure applied to the other surface of the diaphragm. The invention may be used or adapted for any pressure measuring purpose, including oil or gas exploration, aerospace, or any known application requiring measurement of pressure. The invention has the additional advantage that a series of FBG sensors may be formed along a single fiber, and the optical responses may be individually and concurrently read using a wavelength interrogator, or the responses may be time division multiplexed (TDM) and read sequentially.

Figure 3:
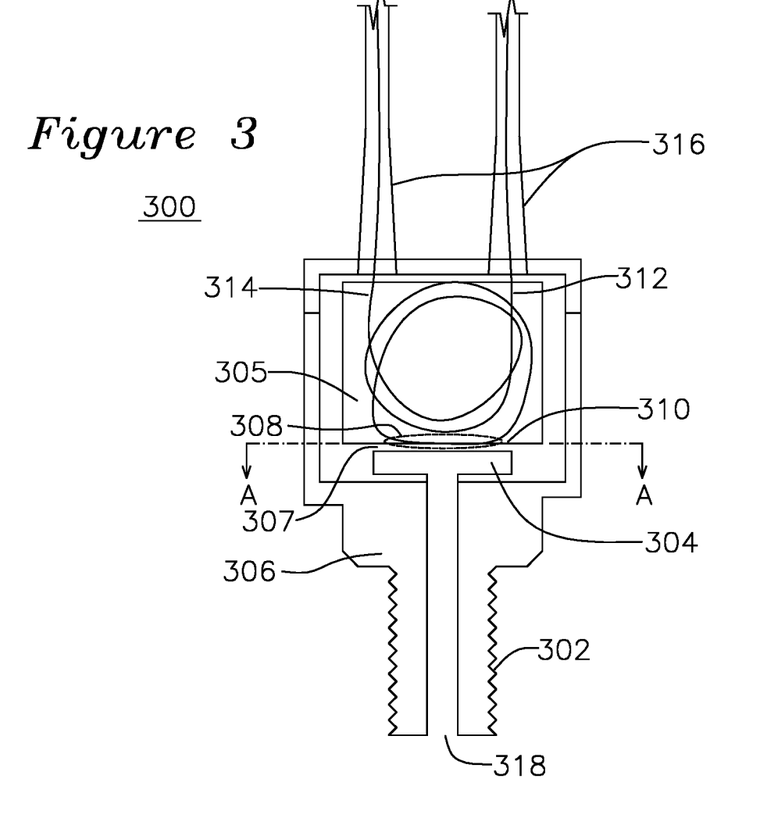
FIG. 3 shows a section view of a pressure transducer according to the present invention.

FIG. 3 shows a cross section view of a first example embodiment of a pressure transducer 300 according to the present invention. The pressure sensor 300 is preferably threaded into an enclosure and secured with threads 302, and a pressure to be measured is applied to port 318 which is coupled into chamber 304 which is separated from a second chamber 305 optionally containing a reference pressure by a transducer diaphragm 307 which separates the two chambers. An increase of pressure in chamber 304 causes a small deflection in diaphragm 307. Strain relief 316 protects optical fiber 312/314, which enters chamber 305, is loosely looped, has regions with FBGs which are secured to diaphragm 307, and the same fiber 312/314 exits the chamber through strain relief 316.

Figure 4:
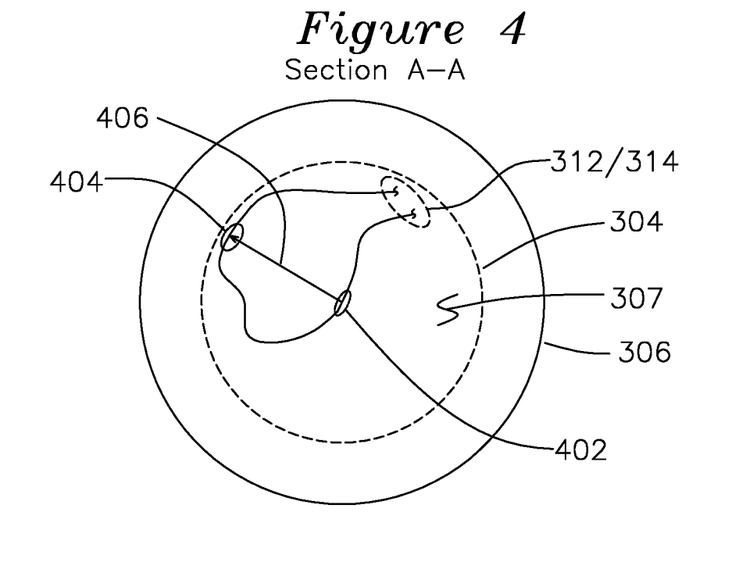
FIG. 4 shows a section view of FIG. 3.

FIG. 4 shows an example section A-A of FIG. 3 (not to scale), including diaphragm 307 which may be formed from housing 306, with chamber 304 below shown with a dashed line. Optical fiber 312/314 is shown entering and leaving the field of view. Near the center of the diaphragm where diaphragm 307 displacement and strain from pressure is maximum is a first FBG sensor 402 which is placed radially (in the direction of maximum strain and dimensional change in response to pressure on the opposite side of the diaphragm), whereas second FBG sensor 404 is placed circumferentially (following radius 406) such that a change in deformation or strain of the diaphragm 307 does not couple a strain into second FBG sensor 404.

Figure 5:
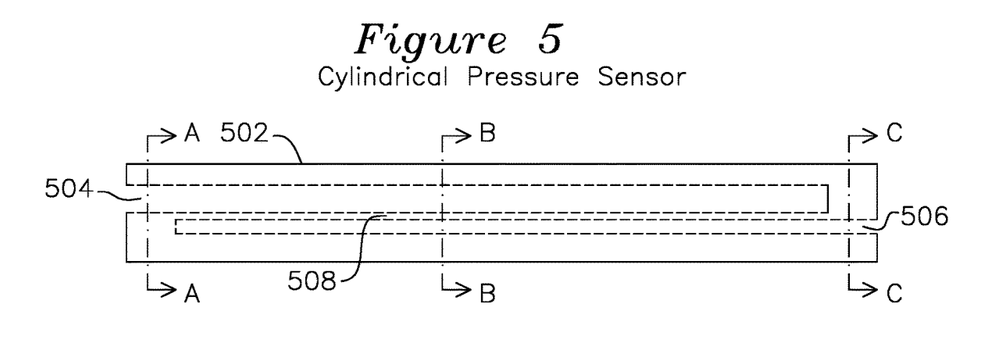
FIG. 5 shows a section view of a cylindrical pressure sensor.
Figure 5A:
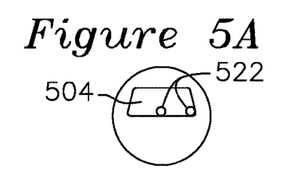
FIGS. 5A, 5B, 5C, 5D, and 5E show various section views of FIG. 5.
Figure 5B:
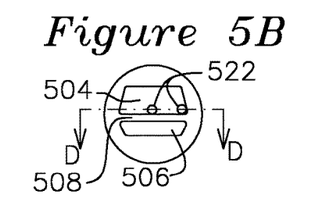
Figure 5C:
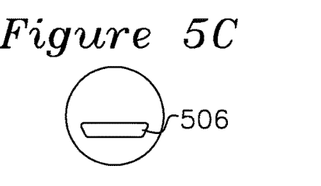

FIG. 5 shows a cylindrical (or rectangular) embodiment of a pressure sensor, where a bar of material 502 has a first blind aperture 506 (an aperture which does not pass completely through the material 502) formed for introduction of a pressure adjacent to a second blind aperture 504 for introduction of the optical fiber with FBG sensors. The introduced pressure in first aperture 506 results in a deformation of diaphragm 508 which is formed by the separation between first and second apertures 504 and 506. The apertures may be drilled holes or machined apertures, and the material 504 may be any shape which accommodates these apertures, including circular bar stock, rectangular bar stock, or the apertures may be formed directly into a structure for which a pressure measurement is desired. FIGS. 5A through 5D show various section views which include the optical fibers 522 and FBG sensors 520 and 524. In one example of the invention, the pressure sensor of FIG. 5 is formed using additive machining (3D printing) of a metal such as stainless steel. When the additive axis is the long axis of the sensor (oriented in the long axis of apertures 504 and 506), it is possible to form arbitrarily complex shapes such as the irregular apertures 504 and 522 shown in FIG. 5B which form septum diaphragm 508. As before, a first FBG sensor 520 is positioned in a region of maximum strain and deflection, and a second FBG sensor 524 is positioned in a region of minimal response to strain and deflection, such as in an orientation which is minimally affected by diaphragm displacement. The first and second FBG sensor are preferably formed on the same fiber, although different fibers may be used. Optical fiber 522 may be routed in any manner which is convenient, including into and out of the open aperture 504, or through additional apertures (not shown). In an example of the invention, the pressure sensor of FIG. 5 is on the order of 2 cm in length with hemispherical upper and lower apertures 506 and 544 forming a septum diaphragm on the order of 125 u, and the FBGs are on the order of 4-5 mm in length. The dimensions and shapes shown in the pressure sensor of FIG. 5 may be preferably formed using additive machining (AM) processes in stainless steel to form a monolithic structure. In another example of the invention for decreasing the porosity of the body of the pressure sensor, the pressure sensor may be formed from an Aluminum alloy such as $AlSi_{10}Mg$, or alternatively, the pressure sensor may be formed of a material known in additive machining and then plated with nickel to a thickness on the order of 0.25 mm, or in another example of the invention, the pressure sensor may be anodized to form a surface passivation such as AlOH to decrease the porosity of the pressure sensor. An order of magnitude dimension is understood to be 10× greater or 0.1× smaller than the example dimension, however the dimensions of the pressure sensor of the present invention are not limited by the present example.

Figure 5D:
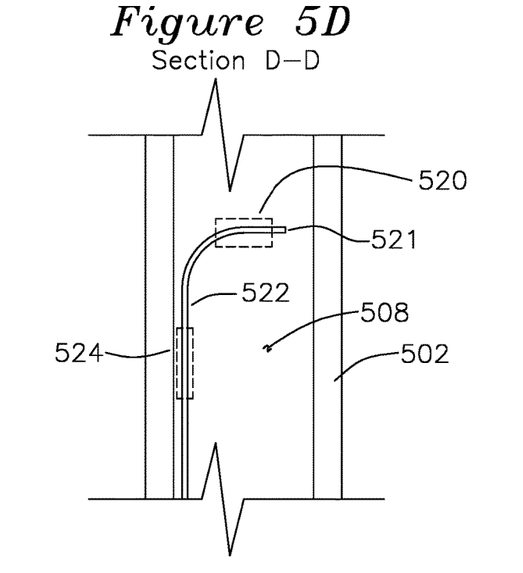
Figure 5E:
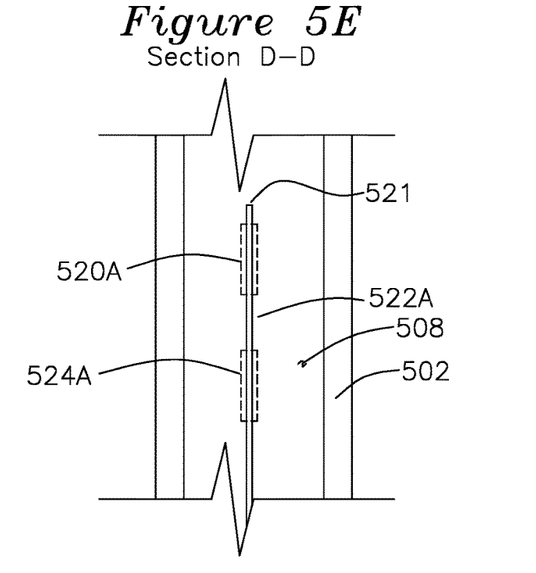

FIG. 5E shows an alternative example for the arrangement of sensors shown in FIG. 5D, where the temperature sensor 524A is collinear with the pressure strain sensor 520A. In this example embodiment, the temperature sensor 524A is mechanically uncoupled from strain by placement into an annular sleeve which couples temperature to the FBG of temperature sensor 524A but not strain, since the unconstrained FBG sensor free to move in the sleeve is not mechanically coupled to strain developed in diaphragm 522, whereas strain sensor 520A is mechanically and thermally coupled to the diaphragm 508 and associated strains it produces from deflection. In a present example of the invention, the fiber terminates at end 521, however in other transmission mode FBG sensors, the fiber may continue and exit the sensor for connection to a wavelength interrogator.

The strain sensing FBGs may be attached to the surface of the diaphragm using any method which minimizes or eliminates hysteresis, and may include metallization of the exterior surface of the FBG sensors for subsequent metallic bonding to the diaphragm using high temperature structural adhesives, or by placing the fiber into a groove in the diaphragm 508 for mechanical attachment. Any means of attachment of the FBG sensor of the fiber to the diaphragm which provides for coupling of the strain or deflection of the diaphragm into a wavelength shift of the FBG sensor while minimizing creep would provide for satisfactory operation of the strain sensor according to the objects of the invention. Additionally, any placement of the temperature sensor which decouples the FBG from strain may be used. While it is preferable for one sensor to measure temperature without the influence of strain, in another example of the invention, the first and second sensor may be exposed to fractionally different strain amounts and substantially the same temperature, as the system of linear equations which resolve pressure are also capable of resolving fractional strains applied to each of the two FBG sensors into a pressure.

Figure 6:
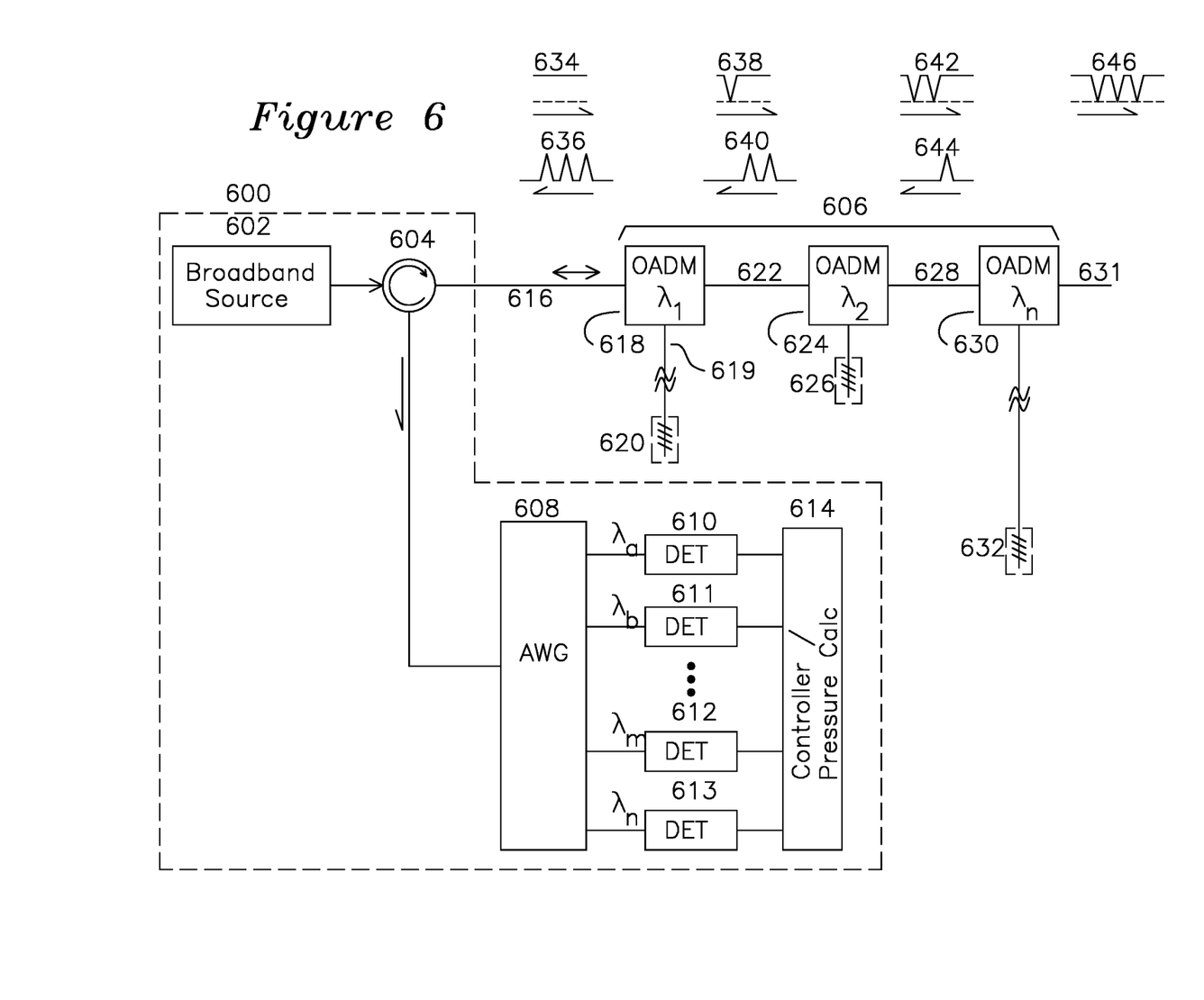
FIG. 6 is a block diagram of the pressure sensors of the present invention coupled to an optical wavelength interrogator.

FIG. 6 shows an example embodiment of a pressure measurement system comprising wavelength interrogator 600 coupled to a plurality of pressure sensors 620, 626, and 632 through add drop multiplexors 618, 624, and 630, respectively. In operation, a broadband source 602, which may operate continuously, couples broadband optical power to circulator 604, which couples broadband optical power to optical fiber 616, and, in sequence, to any number of Optical Add Drop Multiplexers (OADM) 618, 624, and 630, each of which is operative to direct optical energy from a first port such as the first port of OADM 618 coupled to fiber 616 to a sensor port fiber such as 619 coupled to a pressure sensor having FBGs such as sensor 620, where OADM 618 has a wavelength response within an operating wavelength range of the FBGs of 620, such that optical energy reflected from FBG sensor 620 is in a wavelength range λ1 is directed back to the OADM 618 and then to first port coupled to fiber 616, where it counter-propagates back to circulator 604, and to AWG 608 for wavelength detection. The operation of each OADM 618, 624, 630 is in separate wavelength ranges matched to the corresponding FBGs of the sensor gratings 620, 626, and 632. Optical energy which is not in the operating range of a particular OADM such as 618 entering the first port (coupled to fiber 616) is directed to the second port coupled to fiber 622 with minimal attenuation. Accordingly, each OADM 618, 624, and 630 is operative to direct optical energy applied in a respective wavelength range to the sensor port, where it is reflected back to the OADM first port by the FBGs of the sensor, and optical energy which is outside the respective wavelength range of the associated OADM continues to a subsequent OADM which has a first port coupled to the second port of a previous OADM and operates in a unique wavelength range associated with the FBG sensors coupled to each respective OADM sensor port.

Figure 7:
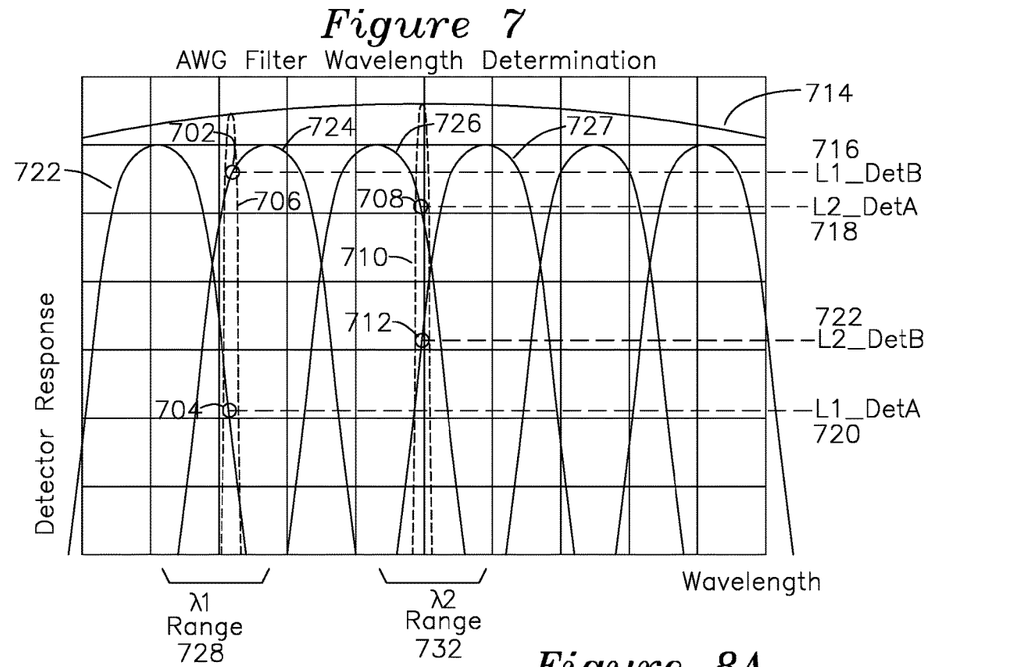
FIG. 7 is a plot of an excitation source with detector responses associated with the AWG filter and detector of FIG. 6.

In this manner, each of the pressure and temperature sensors 620, 626, and 630 associated with the gratings of FIG. 3, 4, or 5 reflect superimposed optical energy as λ1 and λ2 through circulator 604 and to Array WaveGuide (AWG) filter 654, which separates the wavelengths from each reflection grating into separate channels by wavelength as shown in FIG. 7. Preferably, the AWG filter response is Gaussian for each channel, whereas typical AWG filters are designed for a flat amplitude response over each channel operating wavelength range. The Gaussian (or other sloped amplitude response) characteristic of the AWG filter provides preferable ability to discriminate wavelength over a greater fractional wavelength of the AWG channel response range compared to the prior art flat channel response. In one example of the invention, the AWG filter outputs are coupled to detectors 610, 611, 612, and 613, and each FBG sensor operating range is selected to operate between two such channels. The AWG optical outputs are coupled in pairs to optical energy detectors 610 to 613, which are each operative according to the wavelength discrimination principles described in FIG. 7 to resolve the AWG filter response to a wavelength. The AWG filter 654 may provide differential channel outputs as described in U.S. Pat. No. 9,110,259, and 8,983,250, which are incorporated in their entirety by reference. The controller/pressure calculator 614 receives the detected wavelengths for each sensor pair (temperature and strain) reflected (or transmitted) by the FBG sensors and resolves these into a pressure and temperature estimate based on the linear characteristics of the FBG to temperature and pressure, using, in one example, the FBG isolated from strain as a temperature sensor and the FBG coupled to both strain and temperature to resolve pressure and temperature. Different diaphragm materials will have different strain to pressure coefficients, which may be determined experimentally or in a calibration cycle. Additional measurement channels for other FBG sensors may be added by placing additional FBG sensors which are operative within unique wavelengths which also couple optical energy out of AWG filter 608 and are coupled to additional wavelength detectors (not shown) operative at each unique wavelength to detect additional measurement phenomenon such as an optional temperature-only sensor.

FIG. 6 also shows simplified wavelength responses to each of the FBG sensor pairs with respect to OADM operation. Each of the amplitude drops in forward propagating wavelength response plots 634, 638, 642, and 646 correspond to optical energy captured by corresponding OADM 618, 624, and 630 as found in optical fibers 616, 622, 628, and 631, respectively. The counter-propagating optical energy returned by the FBG sensors is shown in wavelength plots 636, 640, and 644, and represent the counter-propagating optical energy in optical fibers 616, 622, and 628, respectively, as reflected by each of the FBG sensors 620, 626, and 632.

FIG. 7 shows an example response plot for AWG filter and detector pairs such as 610/611 and 612/613 of FIG. 6, as well as the broadband source spectral plot 714 (of source 602 of FIG. 6), which changes the amplitude of the reflected FBG sensor energy according to wavelength, since the reflected optical energy will typically be a large fraction (typically >90%) of the input power which varies with wavelength as shown in plot 714. Reflected narrowband optical signals 706 and 710 from an example FBG strain or temperature sensor in first wavelength range λ1 728 and second wavelength range λ2 732 produces a detector response L1_DetA associated with detector channel for 722 at point 704 associated with the first AWG output 722, and also L1_DetB detector output 702 from the detector associated with the second AWG channel 724 responding to reflected optical energy 706. The second associated FBG sensor response 710 in second wavelength range λ2 732 generates a detector output L2_DetA 708 and second AWG output filter characteristic 727 detector output L2_DetB 722. Determination of the wavelengths λ1 and λ2 may then be determined from the characteristic plot of FIG. 7, either by a lookup table which maintains the profiles of plots 722, 724, 726, and 727, or by using a stored formula which converts the detector responses to resolved wavelengths.

The conversion from wavelength to temperature may be performed using a linear relationship between the measured wavelengths of the two sensor FBGs ($\lambda_1$ and λ2) and pressure P, temperature T and the nominal FBG wavelengths at zero differential pressure and at 0° C. ($\lambda_{01}$ and $\lambda_{02}$) as follows:

$$\lambda_1 = a_{11}P + a_{12}T + \lambda_{01}$$

$$\lambda_2 = a_{21}P + a_{22}T + \lambda_{02}$$

$$\begin{bmatrix} \lambda_1 - \lambda_{01} \\ \lambda_2 - \lambda_{02} \end{bmatrix} = \begin{bmatrix} a_{11} & a_{12} \\ a_{21} & a_{22} \end{bmatrix} \begin{bmatrix} P \\ T \end{bmatrix}$$

Therefore, the pressure P and temperature T can be found from the following equations.

$$\begin{bmatrix} P \\ T \end{bmatrix} = \begin{bmatrix} a_{11} & a_{12} \\ a_{21} & a_{22} \end{bmatrix}^{-1} \begin{bmatrix} \lambda_1 - \lambda_{01} \\ \lambda_2 - \lambda_{02} \end{bmatrix} = \begin{bmatrix} C_1 & C_2 \\ C_3 & C_4 \end{bmatrix} \begin{bmatrix} \lambda_1 - \lambda_{01} \\ \lambda_2 - \lambda_{02} \end{bmatrix}$$

where, $$\begin{bmatrix} a_{11} & a_{12} \\ a_{21} & a_{22} \end{bmatrix}^{-1} = \begin{bmatrix} C_1 & C_2 \\ C_3 & C_4 \end{bmatrix}$$

Calibration constants $C_1$, $C_2$, $\lambda_{01}$, and $\lambda_{02}$ $\lambda_{01}$ and $\lambda_{02}$ can be found using a series of wavelength measurements at known pressure points by applying linear regression combined with the set of equations shown below.

$$P_{m1} = C_1\lambda_1^{m1} - C_1\lambda_{01} + C_2\lambda_2^{m1} - C_2\lambda_{02} \quad \text{(Equation 1)}$$

$$P_{m2} = C_1\lambda_1^{m2} - C_1\lambda_{01} + C_2\lambda_2^{m2} - C_2\lambda_{02} \quad \text{(Equation 2)}$$

Similarly, calibration constants $C_3$, $C_4$, $\lambda_{01}$, and $\lambda_{02}$ can be found using a series of wavelength measurements at known temperature points by applying linear regression combined with the set of equations shown below.

$$T_{n1} = C_3\lambda_1^{n1} - C_3\lambda_{01} + C_4\lambda_2^{n1} - C_4\lambda_{02} \quad \text{(Equation 3)}$$

$$T_{n2} = C_3\lambda_1^{n2} - C_3\lambda_{01} + C_4\lambda_2^{n2} - C_4\lambda_{02} \quad \text{(Equation 4)}$$

Each pressure $P_{m1}$, $P_{m2}$, and (and corresponding temperature $T_{n1}$, $T_{n2}$) can be found from the measured wavelengths using the equations above using measured reflected FBG sensor wavelengths $\lambda_1^{m1}$, $\lambda_2^{m1}$, $\lambda_1^{m2}$, $\lambda_2^{m2}$.

Figure 8A:
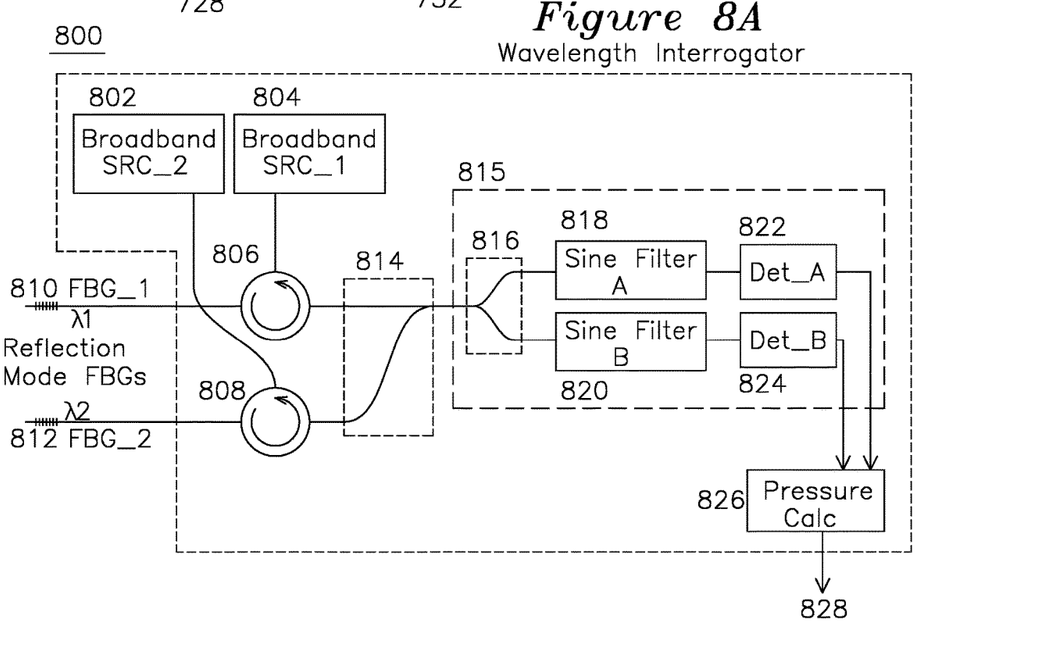
FIGS. 8A and 8B shows a block diagram of a two-fiber wavelength interrogator.
Figure 9:
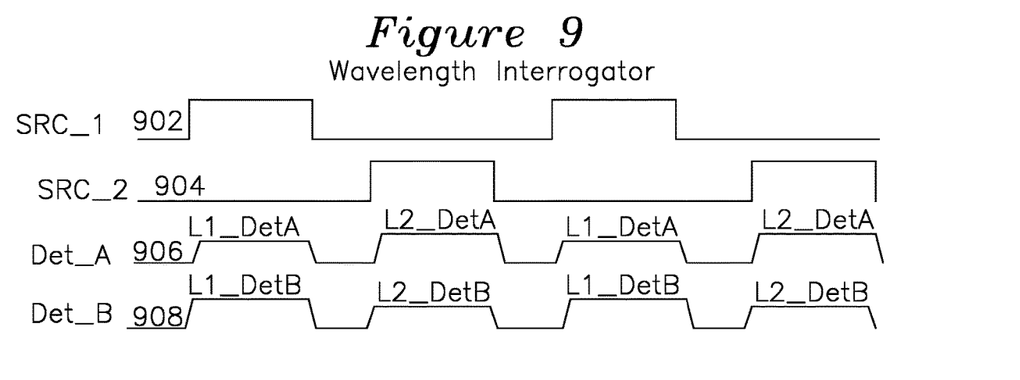
FIG. 9 shows the waveforms for the wavelength interrogator of FIG. 8.

FIG. 9 shows a timing diagram for an alternative wavelength interrogator system shown in FIG. 8A. During a first measurement interval of arbitrary time duration, a first broadband source SRC_1 902 (804 of FIG. 8A) is enabled with second broadband source SRC_2 904 (804 of FIG. 8A) disabled, and during the first measurement interval, SRC_1 804 couples optical energy through circulator 806 to the first FBG strain sensor (operative initially at λ1), and narrowband reflected energy (initially at λ1) from the first sensor is coupled through circulator 806 to combiner 814 (with no optical energy returned from circulator 808 as SRC_2 802 is not enabled during the interval that SRC_1 is enabled), which couples optical energy into wavelength detector 815 which in one embodiment includes a splitter 816 and to a means for discriminating wavelength such as sine filter A 818 and sine filter B 820, which are coupled to first detector DET_A 822 and second detector DET_B 824, respectively. The output from the two detectors 822 and 824 are fed to a pressure calculator 826 which computes the pressure from the amplitude responses (the amplitudes presented to the detectors derived from the wavelength-dependent transfer function of the sine filter), of the two detectors DET_A 822 and DET_B 824 as was described in the previously described equations. During a second measurement interval of arbitrary time duration following the first measurement interval, the first source SRC_1 804 is disabled and the second broadband source SRC_2 804 is enabled. During the second measurement interval, the second circulator 808 couples broadband optical energy to the second FBG strain sensor (operative initially at λ2) through bidirectional port 812, and narrowband optical energy (initially at λ2) reflected from the second sensor is coupled through circulator 808, through combiner 814, and to wavelength detector 815, through splitter 816, and to first sine filter 818 and second sine filter 820, which generate optical outputs related to wavelength as will be described for FIG. 7, and the optical outputs of sine filters 818 and 820 are converted to an electrical signal by first detector 822 and second detector 824, after which the electrical outputs of first and second detectors 822 and 824 are converted to a pressure measurement using pressure calculator 826. For applications with remote measurements having a long optical fiber coupled to the FBG sensors, the first time interval and second time interval are typically established from the time-of-flight interval for the reflected wavelength from the strain sensor FBG to reach the interrogator, and for the detectors to respond thereafter. For a broadband source illuminating the FBGs, it is possible for a wavelength interrogator separated from the measurement gratings by a 10 km fiber length, with an index of refraction of 1.48 for the fiber core (resulting in a 97 us round-trip delay), and a detector with a 2 us response, to therefore operate at a repetition rate of up to 10,000 unambiguous samples per second. In this manner, the repetition rate for any length of fiber and detector response time can be calculated.

Figure 8B:
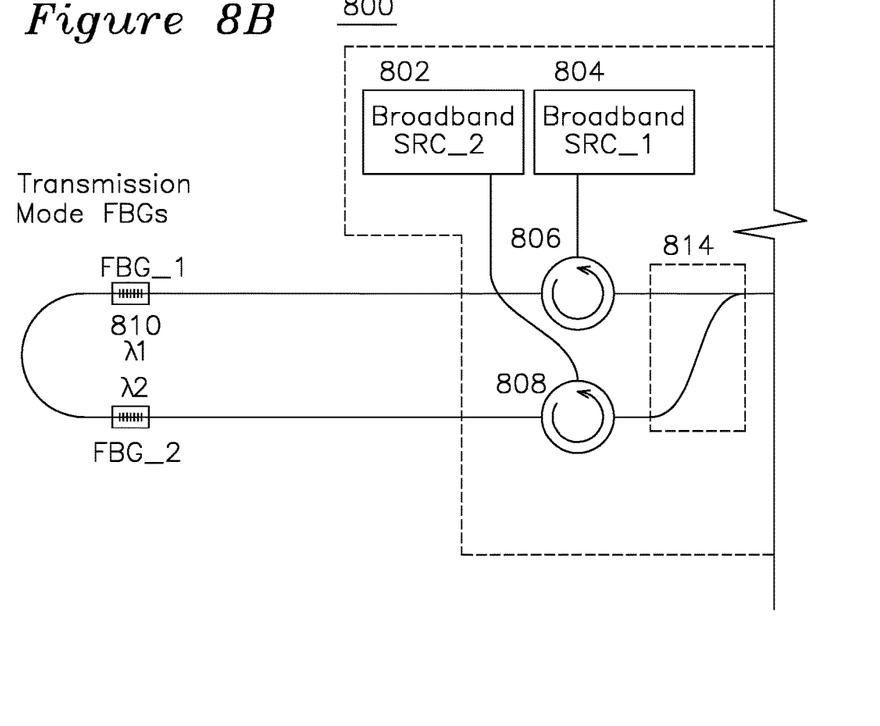

The interrogator 800 of FIG. 8A may be operated in at least one other configuration. For the case where a pair of fibers with FBG sensors are used for redundancy, with each fiber sensing the same mechanical property (one sensor sensing a strain+temperature and the other sensing temperature only), a redundant configuration which provides protection from a single fiber failure is used with reflection gratings, each pair of sensors formed on a single fiber, the separate fibers placed with sensing of strain+temperature and temperature only on diaphragm 307 or 508. FIG. 8B shows an alternative example with a double ended sensor of FIG. 3 or 5 (with the closed fiber end 521 instead continuing through with a return optical fiber for use with transmission mode FBG sensors) is a non-redundant configuration with transmission mode FBGs on the diaphragm surface and located in the previously referenced sensing regions and using the interrogator of FIG. 8A with the FBG connection of FIG. 8B. Any number of FBGs may be used beyond the exemplar two shown.

The present examples of the invention describe Wavelength Division Multiplexing (WDM), where each sensor is operative in a unique wavelength range. In another example of the invention, the optical source may be pulsed on for brief instants of time corresponding to the time-of-flight from a broadband source and back to the wavelength discriminator, operating instead in a Time Division Multiplexing (TDM) mode, with the ON time of the source governed by the spatial separation of the FBGs. It may be preferred to use TDM mode where the separation between FBG sensors is long enough for accurate wavelength resolution, and WDM when the separation between FBG sensors is comparatively shorter.

Typical FBGs are formed using gratings which are formed with variations in index of refraction which are directed coaxially to the central axis of the optical fiber. In another example of the invention, tilted gratings are used in the FBG sensors and the optical source is a multi-mode source with a short duration pulse. Tilted FBG gratings tend to exhibit a mode-specific behavior, such that higher modes of propagating optical energy are reflected towards the cladding of the optical fiber, which results in greater losses of certain higher modes, but also increased optical path length for lower modes. Such a tilted FBG sensor with multi-mode pulsed source configuration, with the FBGs operative in either transmission mode or reflection mode, results in additional modal information which presents at the detector as a time domain response with multiple peaks separated in time, as wavefronts for the various modes arrive separated in time according to the longer path length for each mode. As each of the propagation modes in the FBG respond differently to temperature and pressure variations, it is then possible to provide extraction of temperature and strain from a single FBG by examination of both the wavelength shift and time domain spread in detector response to the reflected (or transmitted for transmission mode FBGs) optical energy. In one example of the invention, increased strain causes a greater shift in time domain reflected wavefronts than does increased temperature, which causes a greater time domain separation in the returned optical energy, resulting in a single tilted grating providing both strain and temperature.

Figure 10:
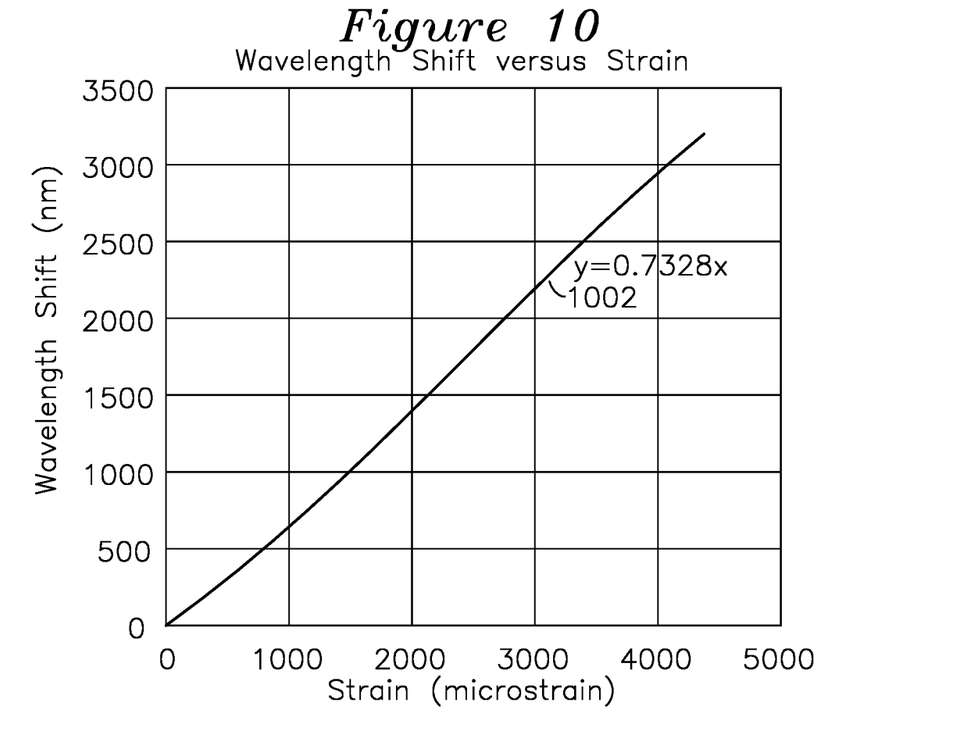
FIG. 10 shows a plot of wavelength shift vs strain of an example FBG sensor.

FIG. 10 shows a wavelength shift characteristics (Y axis) of an FBG having a strain applied (X axis). The wavelength shift is shown with reference to an unspecified starting wavelength associated with the unstressed FBG after mounting into a surface such as the diaphragm 307 of FIG. 3 or diaphragm 508 of FIG. 5. The relationship between wavelength shift and FBG strain can be described as a linear equation, shown for FIG. 11 as Y=0.7328X (ignoring temperature effects for simplicity of illustration).

In a preferred embodiment of the invention, the reflection wavelengths λ1 and λ2 are distinct and non-overlapping over the combinations of temperature and pressure, as shown in the x-axis of FIG. 6 corresponding to a single cycle of sine filter response for uniqueness of y-axis response with λ1 and λ2 in exclusive and non-overlapping wavelength ranges.

There are several motivations for the best mode of non-overlapping ranges of wavelengths produced by the pair of FBGs of a particular pressure transducer. One motivation is to provide a clear association between a particular response wavelength and a given sensor FBG, such that λ1 and λ2 are not indeterminate in the equations. Another advantage of using separate wavelength response ranges is to prevent the "shadowing" of a downstream reflection-mode sensor or additive superposition of a downstream transmission-mode sensor, which would cause two sensors responses to appear as a single sensor response. While it is possible to operate the two sensors in overlapping ranges, a disadvantage is the inability of the wavelength discriminator to distinguish between a single sensor response caused by two separate sensors operating in the same wavelength and a failure in the fiber which interconnects the two FBG sensors, resulting in a single sensor reflection response. By tracking each sensor response for association to a particular sensor, and detection of same-wavelength sensor response, it is possible for the two sensors to operate in overlapping response ranges.

The examples provided herein are for illustration only, and are not intended to limit the invention to only the particular embodiments used for explanation, as set forth in the claims which follow.

We claim:

1. A method for measuring pressure applied to a first surface of a diaphragm, the diaphragm comprising a common sidewall of a first aperture and a second aperture parallel to the first aperture, the diaphragm having a second surface opposite the first surface, the method operative on a first optical fiber with a first fiber Bragg grating (FBG) attached to a region of changed strain of the second surface upon application of pressure to the first surface of the diaphragm, the second surface having a region of unchanged strain upon application of pressure to the first surface of the diaphragm, the region of unchanged strain thermally coupled to the region of changed strain, the region of unchanged strain also having a second FBG attached to the second surface, the method comprising:

application of a pressure to the diaphragm sufficient to cause a change in a reflected or transmitted wavelength of the first FBG;

measuring a first FBG wavelength and a second FBG wavelength;

converting the first FBG wavelength and the second FBG wavelength into a pressure measurement, and optionally a temperature measurement;

where the converting the first FBG wavelength and the second FBG wavelength into a pressure measurement comprising $P_{m1}$ or $P_{m2}$ is one of:

$$P_{m1} = C_1\lambda_1^{m1} - C_1\lambda_{01} + C_2\lambda_2^{m1} - C_2\lambda_{02}$$

$$P_{m2} = C_1\lambda_1^{m2} - C_1\lambda_{01} + C_2\lambda_2^{m2} - C_2\lambda_{02}$$

where:

$C_1$, $C_2$, $\lambda_{01}$, and $\lambda_{02}$ are calibration constants.

2. The method of claim 1 where the converting the first FBG wavelength and the second FBG wavelength into a temperature is $T_{n1}$ or $T_{n2}$ is estimated from one of;

$$T_{n1} = C_3\lambda_1^{n1} - C_3\lambda_{01} + C_4\lambda_2^{n1} - C_4\lambda_{02}$$

$$T_{n2} = C_3\lambda_1^{n2} - C_3\lambda_{01} + C_4\lambda_2^{n2} - C_4\lambda_{02}$$

where $C_3$, $C_4$, $\lambda_{01}$, and $\lambda_{02}$ are calibration constants.

3. A pressure sensor system comprising:

a diaphragm formed by a septum separating a common sidewall of a first blind aperture formed on one end of a rod from a second blind aperture on an opposite end of the rod, the diaphragm having a planar surface of the first blind aperture and a planar surface of the second blind aperture, at least one of the first blind aperture or the second blind aperture coupled to a source of pressure;

an optical fiber having a first fiber Bragg grating (FBG) attached to a sensing region of the diaphragm, the sensing region generating a strain in the first FBG upon application of the source of pressure;
a second FBG attached to a region of the diaphragm which does not generate a strain upon application of the source of pressure;
the first FBG thermally coupled to the second FBG;
an optical interrogator providing broadband excitation to the first FBG and the second FBG, the optical interrogator determining a pressure and optionally a temperature from a wavelength from the first FBG and a wavelength from the second FBG wavelength responses;
the optical interrogator configured to determine a pressure $P_{m1}$ or $P_{m2}$ from a wavelength from the first FBG and a wavelength from the second FBG wavelength using:

$$P_{m1} = C_1 \lambda_1^{m1} - C_1 \lambda_{01} + C_2 \lambda_2^{m1} - C_2 \lambda_{02}$$

$$P_{m2} = C_1 \lambda_1^{m2} - C_1 \lambda_{01} + C_2 \lambda_2^{m2} - C_2 \lambda_{02}$$

where:
$C_1$, $C_2$, $\lambda_{01}$, and $\lambda_{02}$ are calibration constants.

4. The pressure sensor of claim 3 where the first FBG and the second FBG are reflection or transmission gratings.

5. The pressure sensor of claim 3 where the diaphragm has a first pressure coupled to one surface and a second pressure coupled to an opposite surface.

6. The pressure sensor of claim 3 where the first FBG and the second FBG are coupled to different optical fibers.

7. The pressure sensor of claim 3 where the first blind aperture and the second blind aperture have a common sidewall forming the diaphragm.

8. The pressure sensor of claim 3 where the first FBG is positioned orthogonal to the second FBG.

9. The pressure sensor of claim 3 where the first FBG and the second FBG are positioned on the same sidewall forming the diaphragm.

10. A pressure sensor system comprising:
a diaphragm formed by a septum separating a sidewall of a first blind aperture formed on one end of a rod from a second blind aperture on an opposite end of the rod, the diaphragm comprising a planar surface separating the first blind aperture from the second blind aperture, at least one of the first blind aperture or the second blind aperture configured to be coupled to a source of pressure;
an optical fiber having a first fiber Bragg grating (FBG) configured to be attached to a sensing region of the diaphragm, the sensing region generating a strain in the first FBG upon application of the source of pressure;
a second FBG configured to be attached to a region of the diaphragm which does not generate a strain in the second FBG upon application of the source of pressure;
the first FBG thermally coupled to the second FBG;
a wavelength interrogator configured to convert the first FBG wavelength and the second FBG wavelength into a pressure $P_{m1}$ or $P_{m2}$ rom at least one of:

$$P_{m1} = C_1 \lambda_1^{m1} - C_1 \lambda_{01} + C_2 \lambda_2^{m1} - C_2 \lambda_{02}$$

$$P_{m2} = C_1 \lambda_1^{m2} - C_1 \lambda_{01} + C_2 \lambda_2^{m2} - C_2 \lambda_{02}$$

where:
$C_1$, $C_2$, $\lambda_{01}$, and $\lambda_{02}$ are calibration constants.

11. The pressure sensor of claim 10 where the first FBG and the second FBG are reflection or transmission gratings.

12. The pressure sensor of claim 10 where the second FBG is positioned in a sleeve isolating the second FBG from a strain on the diaphragm.

13. The pressure sensor of claim 10 where the second FBG is configured to be attached to the diaphragm in an orientation which is orthogonal to the first FBG.

* * * * *